United States Patent
Chakravarty et al.

(10) Patent No.: US 11,827,203 B2
(45) Date of Patent: Nov. 28, 2023

(54) MULTI-DEGREE-OF-FREEDOM POSE FOR VEHICLE NAVIGATION

(71) Applicant: Ford Global Technologies, LLC, Dearborn, MI (US)

(72) Inventors: Punarjay Chakravarty, Campbell, CA (US); Shubham Shrivastava, Sunnyvale, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 377 days.

(21) Appl. No.: 17/148,994

(22) Filed: Jan. 14, 2021

(65) Prior Publication Data

US 2022/0219708 A1    Jul. 14, 2022

(51) Int. Cl.
*B60W 40/12* (2012.01)
*G06N 3/04* (2023.01)
*G06T 7/521* (2017.01)
*G06T 17/10* (2006.01)
(Continued)

(52) U.S. Cl.
CPC .............. *B60W 40/02* (2013.01); *G06N 3/04* (2013.01); *G06T 7/521* (2017.01); *G06T 17/10* (2013.01); *B60W 2050/0035* (2013.01); *B60W 2520/14* (2013.01); *B60W 2520/16* (2013.01); *B60W 2520/18* (2013.01)

(58) Field of Classification Search
CPC ......... B60W 40/12; B60W 2050/0035; B60W 2520/14; B60W 2520/16; B60W 2520/18; G06T 7/521; G06T 17/10; G06N 3/04
See application file for complete search history.

(56) References Cited

U.S. PATENT DOCUMENTS

| 10,382,739 B1 | 8/2019 | Rusu et al. | |
| 11,652,965 B2 * | 5/2023 | Meier | H04N 9/3185 |
| | | | 353/28 |
| 2019/0349571 A1* | 11/2019 | Herman | H04N 23/698 |

(Continued)

FOREIGN PATENT DOCUMENTS

| CN | 111161387 A | 5/2020 |
| WO | 2020052540 A1 | 3/2020 |
| WO | 2020064955 A1 | 4/2020 |

OTHER PUBLICATIONS

Feature Matching—OpenCV-Python Tutorials 1 documentation, https://opencv-python-tutroals.readthedocs.io/en/latest/py_tutorials/py_feature2d/py_matcher/py_matcher.html.

(Continued)

*Primary Examiner* — Jeff A Burke
*Assistant Examiner* — Mohamad O El Sayah
(74) *Attorney, Agent, or Firm* — Frank A. MacKenzie; Bejin Bieneman PLC

(57) ABSTRACT

A computer, including a processor and a memory, the memory including instructions to be executed by the processor to capture, from a camera, one or more images, wherein the one or more images include at least a portion of a vehicle, receive a plurality of keypoints corresponding to markers on the vehicle and instantiate a virtual vehicle corresponding to the vehicle. The instructions include further instructions to determine rotational and translation parameters of the vehicle by matching a plurality of virtual keypoints to the plurality of keypoints and determine a multi-degree of freedom (MDF) pose of the vehicle based on the rotational and translation parameters.

16 Claims, 7 Drawing Sheets

(51) Int. Cl.
    *B60W 50/00*     (2006.01)
    *B60W 40/02*     (2006.01)

(56) References Cited

U.S. PATENT DOCUMENTS

| | | | | |
|---|---|---|---|---|
| 2020/0098131 | A1* | 3/2020 | Rivera | G06T 7/73 |
| 2020/0353878 | A1* | 11/2020 | Briggs | G01S 17/931 |
| 2021/0004983 | A1* | 1/2021 | Fischer | G06T 7/70 |
| 2021/0078597 | A1* | 3/2021 | Cai | B60W 60/0016 |
| 2021/0158564 | A1* | 5/2021 | Chakravarty | G06K 19/07762 |
| 2021/0286924 | A1* | 9/2021 | Wyrwas | G06F 30/15 |

OTHER PUBLICATIONS

Garcia Lopez et al., Vehicle pose estimation via regression of semantic points of interest', This work was supported by the Catalan Government inside the program "Doctorats Industrials" and by the company Ficosa Adas S.L.U. J. Garcia Lopez is supported by the industrial doctorate of the AGAUR, Jul. 27, 2019.
He et al., "Mask R-CNN", arXiv:1703.06870v3 [cs.CV] Jan. 24, 2018.
Shrivastava et al., "CubifAE-3D: Monocular Camera Space Cubification on Autonomous Vehicles for Auto-Encoder based 3D Object Detection", arXiv:2006.04080v1 [cs.CV] Jun. 7, 2020.
Signed distance function—Wikipedia, https://en.wikipedia.org/wiki/Signed_distance_function[.

\* cited by examiner

MULTI-DEGREE-OF-FREEDOM POSE FOR VEHICLE NAVIGATION

BACKGROUND

Autonomous vehicles can execute computer-controlled steering and speed-control based on sensor input. Among other things, the vehicle may use GPS data to determine a navigation path. In the absence of GPS data, the vehicle may cease autonomous operation due to a lack of information regarding its surroundings.

DETAILED DESCRIPTION

Figure 1:
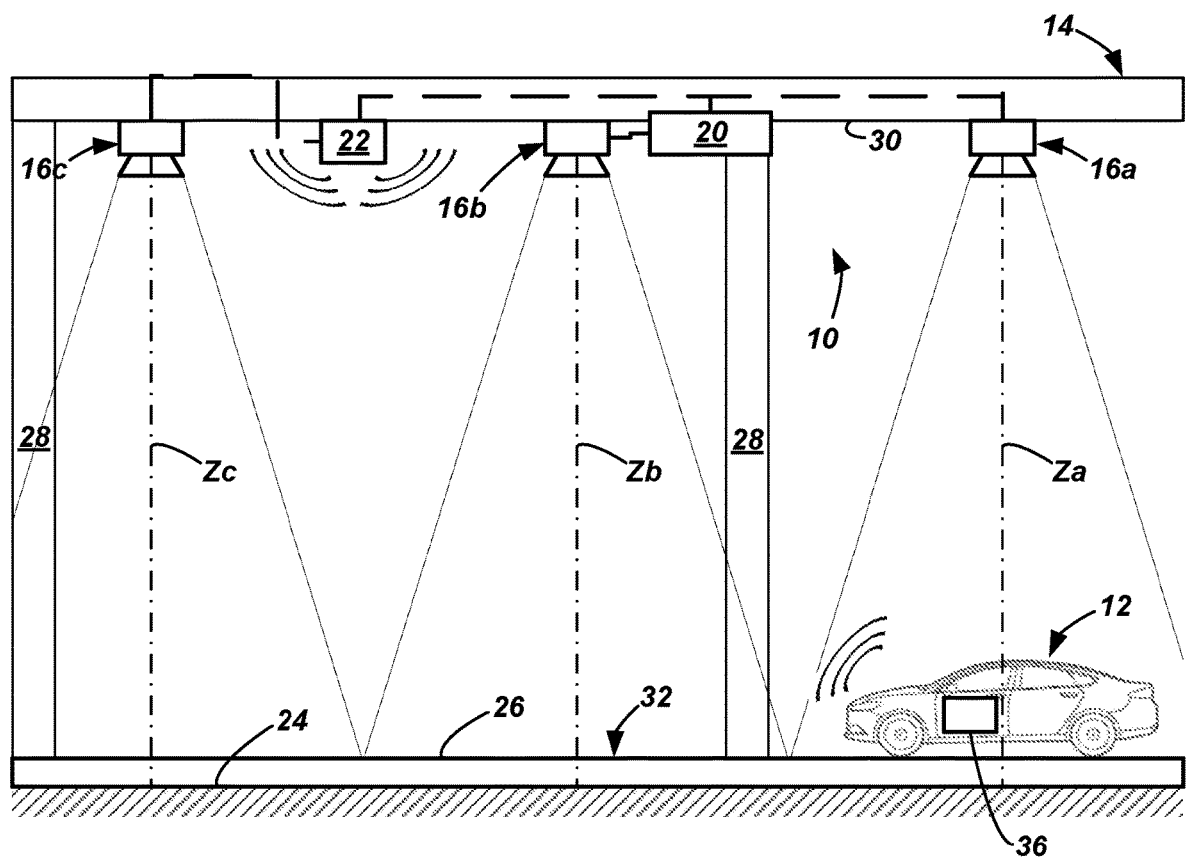
FIG. 1 is a schematic diagram of a structure comprising an imaging system that is used to assist with vehicle navigation.
Figure 2:
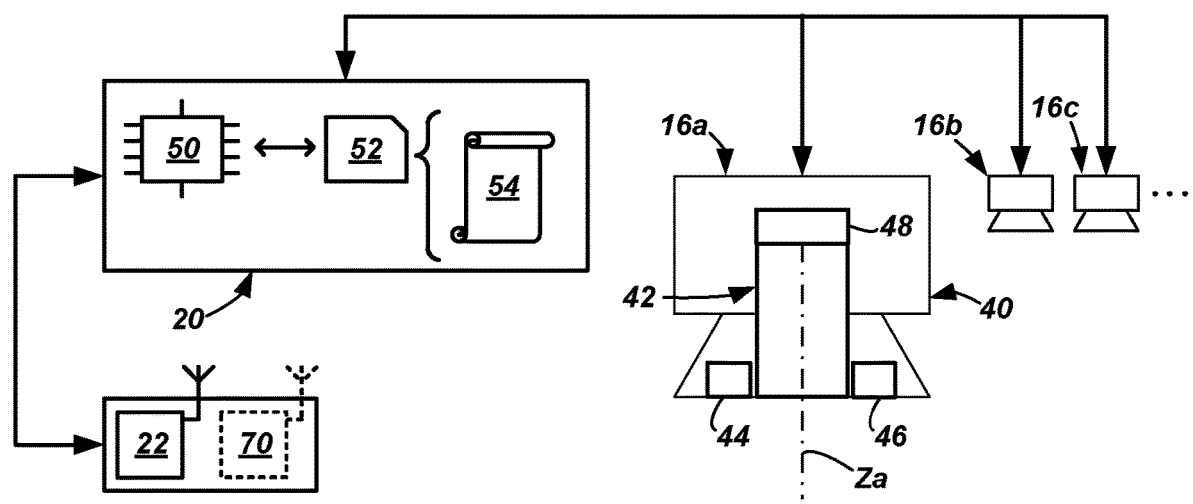
FIG. 2 is a schematic diagram of exemplary components of the imaging system of FIG. 1, the components including a plurality of electronic depth cameras, at least one computer that receives camera data from the plurality of electronic depth and uses the camera data to determine navigation data for a vehicle, and a wireless transceiver that is used for communication between the vehicle and computer.

Techniques discussed herein include a cross-modal supervision technique for labeling depth data. A mode in the present context is a technique for determining data based on a type of sensor, where a sensor can be a video sensor that acquires visible or infrared light, a lidar sensor that acquires range data or radar sensor that acquires radar reflections. In techniques described herein, an electronic depth camera acquires both red-green-blue (RGB) color video data and range data in a single sensor and is therefore cross-modal. Electronic depth cameras are discussed in relation to FIG. 1, below. Techniques for cross-modal supervision may include capturing, from a first electronic depth camera, a depth image and a red-green-blue image, wherein the depth image and a red-green-blue image includes at least a portion of a vehicle, wherein the red-green-blue image includes a depiction of fiducial marker positioned on an exterior surface of the vehicle; calculating a multi-degree of freedom (MDF) pose of the vehicle based on the red-green-blue image; assigning a label to the depth image, wherein the label comprises the calculated MDF pose of the vehicle; and training a deep neural network with the labeled depth image.

Techniques disclosed herein improve determining an MDF pose of the vehicle by training a deep neural network with the labeled depth image; receiving a non-labeled depth image; comparing the calculated MDF pose with an actual MDF pose of the vehicle; and updating one or more weights of the deep neural network based on the comparison; receiving a non-labeled depth image that includes at least a portion of a vehicle; and calculating a multi-degree of freedom (MDF) pose of the vehicle based on the non-labeled depth image; and sending a command to the vehicle to navigate to a new waypoint based on the calculated MDF pose of the vehicle.

According to the at least one example, a computer program product is disclosed that includes a computer readable medium that stores instructions which are executable by a computer processor, wherein the instructions of the computer program product include any combination of the examples of the method(s) set forth above and/or any combination of the instructions executable by the one or more processors, as set forth above and herein.

Disclosed herein is a method, including capturing, from a camera, one or more images, wherein the one or more images include at least a portion of a vehicle, receiving a plurality of keypoints corresponding to markers on the vehicle, instantiating a virtual vehicle corresponding to the vehicle, determining rotational and translation parameters of the vehicle by matching a plurality of virtual keypoints to the plurality of keypoints and determining a multi-degree of freedom (MDF) pose of the vehicle based on the rotational and translation parameters. The MDF pose can be downloaded to a computer included in the vehicle. The vehicle can be operated by controlling vehicle powertrain, vehicle steering, and vehicle brakes based on the MDF pose. Dimensions of the virtual vehicle can correspond to dimensions of the vehicle. A make and a model of the vehicle can be determined via a deep neural network. The deep neural network can be a convolutional neural network (CNN). The camera is can be a red-green-blue-depth (RGBD) camera.

The vehicle can be tracked through a plurality of images and the MDF pose of the vehicle can be determined in the plurality of images. The MDF pose can be determined by comparing a projected silhouette of the vehicle to an actual silhouette of the vehicle for a plurality of cameras. The MDF pose can be determined by constraining the MDF pose to be on a ground plane by determining a silhouette energy function which measures an alignment between the projected silhouette and the actual silhouette. A projected silhouette can be generated by determining 3D points on a ray extending from a camera center that intersects with a volume boundary of the MDF pose. The MDF pose can be determined by calculating a ground-plane energy function that ensures that the virtual vehicle is parallel to a ground plane at each point on its trajectory. The virtual vehicle can be ensured to be parallel to the ground plane by constraining the rotation of the virtual vehicle by calculating a dot product between a vector centered at the virtual vehicle coordinate frame and a vector normal to the ground plane. The pose of the virtual vehicle can be constrained to the ground plane by summing translational and rotational energy terms to obtain a cumulative energy parameter.

Disclosed is a computer readable medium, storing program instructions for executing some or all of the above method steps. Further disclosed is a computer programmed for executing some or all of the above method steps, including a computer apparatus, programmed to capture, from a camera, one or more images, wherein the one or more images include at least a portion of a vehicle, receive a plurality of keypoints corresponding to markers on the vehicle, instantiating a virtual vehicle corresponding to the vehicle, determine rotational and translation parameters of the vehicle by matching a plurality of virtual keypoints to the plurality of keypoints and determine a multi-degree of freedom (MDF) pose of the vehicle based on the rotational and translation parameters. The MDF pose can be downloaded to a computer included in the vehicle. The vehicle can be operated by controlling vehicle powertrain, vehicle steering, and vehicle brakes based on the MDF pose. Dimensions of the virtual vehicle can correspond to dimensions of the vehicle. A make and a model of the vehicle can be determined via a deep neural network. The deep neural network can be a convolutional neural network (CNN). The camera is can be a red-green-blue-depth (RGBD) camera.

The computer can be further programmed to track the vehicle through a plurality of images and the MDF pose of the vehicle can be determined in the plurality of images. The MDF pose can be determined by comparing a projected silhouette of the vehicle to an actual silhouette of the vehicle for a plurality of cameras. The MDF pose can be determined by constraining the MDF pose to be on a ground plane by determining a silhouette energy function which measures an alignment between the projected silhouette and the actual silhouette. A projected silhouette can be generated by determining 3D points on a ray extending from a camera center that intersects with a volume boundary of the MDF pose. The MDF pose can be determined by calculating a ground-plane energy function that ensures that the virtual vehicle is parallel to a ground plane at each point on its trajectory. The virtual vehicle can be ensured to be parallel to the ground plane by constraining the rotation of the virtual vehicle by calculating a dot product between a vector centered at the virtual vehicle coordinate frame and a vector normal to the ground plane. The pose of the virtual vehicle can be constrained to the ground plane by summing translational and rotational energy terms to obtain a cumulative energy parameter.

Turning now to the figures, wherein like reference numerals indicate like or similar features and/or functions, an imaging system 10 for guiding, i.e., assisting navigation of a vehicle 12 is shown in FIG. 1. The imaging system 10 can be installed in a structure 14 (e.g., such as a parking garage) and comprises a plurality of electronic depth cameras 16a, 16b, 16c, at least one computer 20 that processes data from the cameras 16a, 16b, 16c, and at least one wireless transceiver 22 to communicate with the vehicle 12. As will be explained further below, a respective optical axis (Za, Zb, Zc) corresponding to each camera 16a, 16b, 16c is normal to (or plumb with respect to) the ground (or Earth) 24 (e.g., in FIG. 1, each optical axis (Za, Zb, Zc) also is normal to a floor 26 of the structure 14 as well; however, as shown in FIGS. 4A, 4B, 5A, 5B, 6A, and 6B, this is not required in all examples). Imaging system 10 may be useful when a satellite-based positioning signal is too weak to be used successfully by vehicle-navigation equipment (e.g., inside some parking garages). For example, in these circumstances, available localization data (typically determined by the vehicle's computing systems) may be inadequate to navigate the vehicle 12. Hence, the imaging system 10 may determine suitable localization data on behalf of the vehicle 12. As explained below, camera 16a may capture one or more images that include at least a portion of vehicle 12, and computer 20 (using a deep neural network) may determine a multi-degree-of-freedom (MDF) pose of the vehicle 12—e.g., typically, this is a six-degree-of-freedom (6DOF) pose; however, this quantity is not required. Using the image(s) and this MDF pose information, the computer 20 may determine the vehicle's position in the structure relative to obstacles therein (e.g., such as other vehicles, pillars 28 in the structure 14, etc.), as well as waypoint data by which to instruct the vehicle 12 to navigate. Computer 20 may send a navigation command to the vehicle 12 via the wireless transceiver 22, and the vehicle 12 may move within the structure 14 according to the command. This process may be repeated throughout the field of view (FOV) of camera 16a. Further, when vehicle 12 enters the FOV of camera 16b, a hand-off may occur, and a similar process may be executed using camera 16b and computer 20—thereby enabling the vehicle 12 to continue to navigate through another region of the structure 14. A more detailed explanation of this process follows a detailed description of the elements shown in FIGS. 1-6B.

Turning to FIG. 1, the illustrated vehicle 12 is a passenger vehicle; however, this is merely one example. Vehicle 12 instead could be a truck, a sports utility vehicle (SUV), a recreational vehicle, a bus, or any other suitable vehicle that comprises an autonomous driving computer. For example, the Society of Automotive Engineers (SAE) has defined vehicle operation at levels 0-5, ranging from no autonomy to full autonomy. More particularly, vehicle 12 may comprise one or more computers 36 configured to store and execute logic instructions or sets of instructions embodied in hardware, software, firmware, a combination thereof, or the like to thereby enable vehicle 12 to operate with some user assistance (partial autonomy) or without any user assistance (full autonomy). For example, at levels 0-2, a human driver monitors or controls the majority of the driving tasks, often with no help from the vehicle 12. For example, at level 0 ("no automation"), a human driver is responsible for all vehicle operations. At level 1 ("driver assistance"), vehicle 12 sometimes assists with steering, acceleration, or braking, but the driver is still responsible for the vast majority of the vehicle control. At level 2 ("partial automation"), vehicle 12 can control steering, acceleration, and braking under certain circumstances without human interaction. At levels 3-5, vehicle 12 assumes more driving-related tasks. At level 3 ("conditional automation"), vehicle 12 can handle steering, acceleration, and braking under certain circumstances, as well as monitoring of the driving environment. Level 3 may require the driver to intervene occasionally, however. At level 4 ("high automation"), vehicle 12 can handle the same tasks as at level 3 but without relying on the driver to intervene in certain driving modes. At level 5 ("full automation"), vehicle 12 can handle all tasks without any driver intervention. In at least one example, the steering control mode of vehicle 12 includes operation of the vehicle 12 at SAE levels 3-5 (operation in a semi or fully autonomous mode)—e.g., at least within structure 14.

Structure 14 is illustrated, as a non-limiting example, as a parking garage having a ceiling 30, a floor 26, and multiple pillars 28 which support the ceiling 30 relative to floor 26. The floor 26 and ceiling 30 may or may not be level with respect to ground 24 (i.e., the surface of the earth) and may or may not be parallel to one another. In some examples, such as those shown in FIGS. 4B and 5B, the floor 26 is inclined (e.g., at angles $\alpha$ and $\beta$, respectively). Typically, angles $\alpha$ and $\beta$ are less than or equal to six degrees (e.g., angle $\alpha$ may be 3° and angle $\beta$ may be 6°); however, these are merely examples. Structure 14 may be supported by pillars 28 or any other design or feature (e.g., including walls, concrete barriers, etc.). In general, structure 14 is design as a vehicle through-way or parking venue—thus, structure 14 may have an entrance (not shown), an exit (not shown), and at least one predetermined route 32 (along the floor 26) connecting the entrance and exit. Other non-limiting examples of structure 14 include an underground passage (e.g., a tunnel or the like), an enclosed depot, and an enclosed terminal facility.

In general, at least some regions of structure 14 may be devoid of a useful satellite-based positioning signal (i.e., absent a satellite-based positioning signal or alternatively, the satellite positioning signal is present but weak). Weak may be defined as being attenuated and being less than a threshold; e.g., the threshold may be below a predetermined value that is usable by vehicle-navigation equipment. According to an example, the satellite-based positioning signal may be a wireless signal from a satellite using global positioning system (GPS), global satellite navigation system (GLONASS), or the like.

According to one example, each of the electronic depth cameras 16a, 16b, 16c may be similar or identical. Therefore, only one (16a) will be described in detail. It should be appreciated that any quantity of electronic depth cameras can be used (three are shown only by way of example).

Electronic depth camera 16a may be any suitable electronic camera which is capable of receiving depth data; i.e., a range between the camera 16a and a surface of an object within the field of view of the camera 16a. One non-limiting example of electronic depth camera 16a is a red-green-blue-depth (RGBD) camera, such as that shown in FIG. 2. For example, camera 16a may comprise a housing 40 that may be couplably fixed to ceiling 30 of structure 14, an optical assembly 42 carried by the housing 40, wherein optical axis Za is the optical axis of optical assembly 42, one or more infrared (IR) emitters 44 (only one is shown for purposes of illustration), and one or more infrared (IR) depth sensors 46 (only one is shown for purposes of illustration). By way of example, the optical assembly 42 may comprise a photosensitive array 48 and one or more lens (not shown) within the housing 40 and aligned along the optical axis Za. In operation, the camera 16a determines one or more images (e.g., image frames), and each image frame comprises color information and depth information corresponding to objects within the image frame. For example, the photosensitive array 48 may receive color image data while concurrently the IR emitters 44 and IR depth sensors 46 are used to determine depth image data; and ultimately a processor (not shown) of the camera 16a correlates both color image data and depth image data into an image which is provided to computer 20 (as described below). A couple non-limiting commercial examples of RGBD cameras are the Astra S 3D Camera by Orbbec and the Realsense D435 by Intel; other examples exist. In some implementations of imaging system 10, an RGBD camera is desirable as RGBD cameras typically have a front focal distance (FFD) between 2 and 5 meters (e.g., as opposed to lidar systems which typically have an FFD in the hundreds of meters). Further, RGBD cameras may cost substantially less than lidar systems.

Each of cameras 16a, 16b, and 16c may be mounted to ceiling 30 or other features of structure 14 so that the respective optical axes Za, Zb, Zc are plumb with respect to ground 24. According to one example, cameras 16a, 16b, 16c may be spaced from one another so as to minimize overlap of their respective FOVs. According to the example shown in FIG. 1, when vehicle 12 is centered within the FOV of camera 16a, vehicle 12 is not within the FOVs of cameras 16b and 16c and camera 16a can determined six-degree-of-freedom pose detection. According to another example, the overlap is not minimized. For example, the overlap of the respective FOVs may be up to the length of vehicle 12 (e.g., where there is full coverage of the vehicle 12 at the height thereof). Other overlap examples also exist.

Multiple cameras 16a-16c may be electrically coupled to computer 20 (e.g., at least communicatively coupled).

Computer 20 may comprise one or more processors 50 (only one is shown in the diagram for purposes of illustration), memory 52, and a plurality of instructions 54 (by way of example only, software code) which is stored on memory 52 and which is executable by processor(s) 50. Processor(s) 50 may be programmed to process and/or execute digital instructions to carry out at least some of the tasks described herein. Non-limiting examples of processor(s) 50 include one or more of a microprocessor, a microcontroller or controller, an application specific integrated circuit (ASIC), a field-programmable gate array (FPGA), one or more electrical circuits comprising discrete digital and/or analog electronic components arranged to perform predetermined tasks or instructions, etc.—just to name a few. In at least one example, processor(s) 50 read from memory 52 and execute multiple sets of instructions (e.g., including instructions 54) which may be embodied as a computer program product stored on a non-transitory computer-readable storage medium (e.g., such as memory 52). Non-limiting examples of instructions 54 will be described below in the processes illustrated using flow diagrams and described elsewhere herein, wherein these and other instructions may be executed in any suitable sequence unless otherwise stated. The instructions and the example processes described below are merely embodiments and are not intended to be limiting.

Memory 52 may include any non-transitory computer usable or readable medium, which may include one or more storage devices or storage articles. Exemplary non-transitory computer usable storage devices include conventional hard disk, solid-state memory, random access memory (RAM), read-only memory (ROM), erasable programmable read-only memory (EPROM), electrically erasable programmable read-only memory (EEPROM), as well as any other volatile or non-volatile media. Non-volatile media include, for example, optical or magnetic disks and other persistent memory, and volatile media, for example, also may include dynamic random-access memory (DRAM). These storage devices are non-limiting examples; e.g., other forms of computer-readable media exist and include magnetic media, compact disc ROM (CD-ROMs), digital video disc (DVDs), other optical media, any suitable memory chip or cartridge, or any other medium from which a computer can read. As discussed above, memory 52 may store one or more sets of instructions (e.g., such as instructions 54) which may be embodied as software, firmware, or other programming instructions executable by the processor(s) 50—including but not limited to the instruction examples set forth herein. In operation, processor(s) 50 may read data from and/or write data to memory 52.

Figure 5:
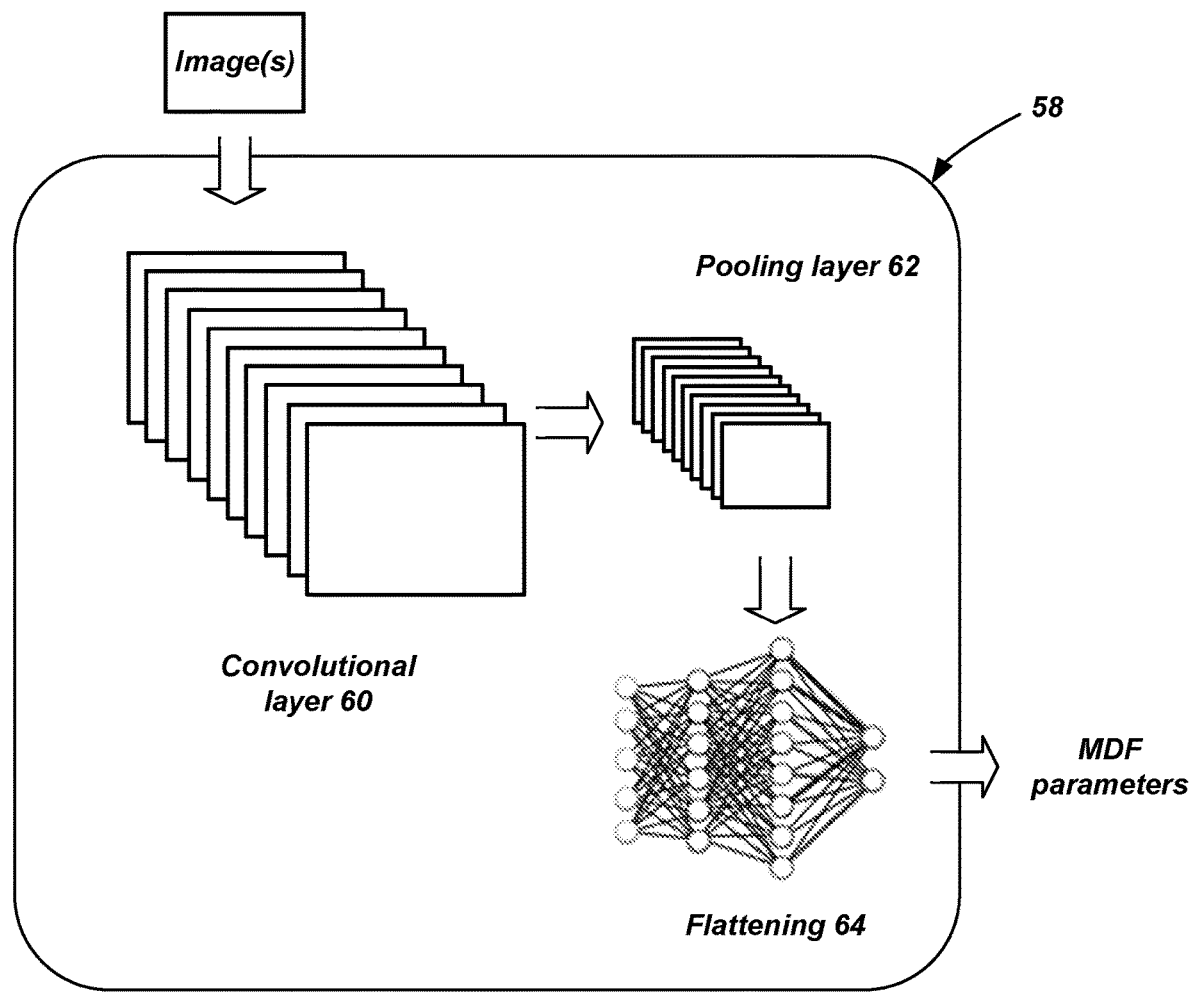
FIG. 5 is a schematic diagram illustrating an example of a deep neural network used to determine multi-degree-of-freedom (MDF) pose.

The instructions 54 (stored in memory 52 and executable by processor(s) 50) may comprise any suitable set of instructions for carrying out the methods described herein. As described more fully below, the instructions 54 may include at least one deep neural network 58 (an example is shown in FIG. 5) that determines, from the one or more images, a multi-degree-of-freedom (MDF) pose of vehicle 12. The processor(s) 50 then may execute other instructions 54. E.g., using the MDF pose, processor(s) 50 may determine a two-dimensional (2D) projection of vehicle 12 onto the route 32 (or onto a deviation from route 32). Furthermore, processor(s) 50 may: determine potential interferences of vehicle 12 with objects within the structure 14 (pillars 28, walls, other features) by evaluating spacing of vehicle 12 with respect to such objects and a heading of vehicle 12 with respect to such objects (or projections thereof); determine a path that follows route 32 (or a deviation therefrom) to avoid collisions; determines a centroid of volume of the vehicle; determine a waypoint that corresponds with the centroid of volume; determine another waypoint along the path that avoids collision of the vehicle with other objects; and communicate, using wireless transceiver 22, a command to vehicle 12 to move to the determined waypoint. These are examples for purposes of explication, some of which will be explained in greater detail below.

Deep neural network 58 (see FIG. 5) may be a convolutional neural network (CNN) adapted to classify vehicle pose based on the captured color image data and the captured depth image data (e.g., as inputs to the CNN). According to one non-limiting example, deep neural network 58 may comprise a convolutional layer 60, a pooling layer 62, and flattening 64. The convolutional layer 60 may receive image frames and convolve the image frames using a kernel or filter—e.g., yielding a plurality of convolved features. Thereafter, the pooling layers 62 may reduce the spatial size of the convolved features. Typically (although not required), there may exist multiple iterations of convolution followed by pooling. Thereafter, flattening 64 may convert the pooling output to a suitable column vector for input to a neural network, wherein classification occurs (e.g., using at least one predetermined neural network function, e.g., such as SoftMax)—the classification in the instant example pertaining to MDF pose. Other aspects and convolution techniques may be employed as well.

Figure 3A:
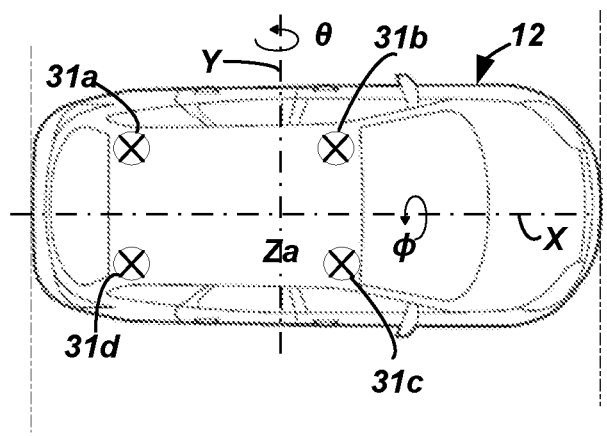
FIG. 3A is a diagrammatic illustration of a vehicle within a field-of-view of a camera, wherein the vehicle includes a fiducial marker for training of the imaging system.
Figure 3B:
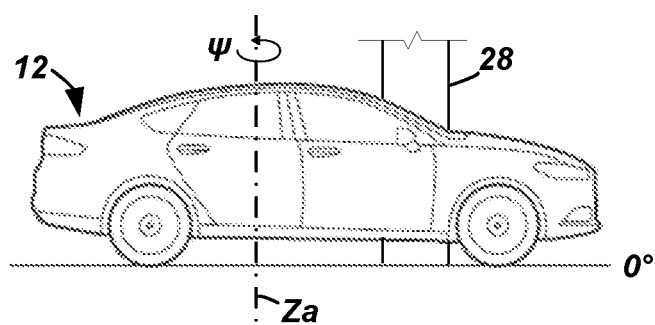
FIG. 3B is a diagrammatic illustration of the vehicle within the field-of-view of the camera, wherein the vehicle does not include the fiducial marker during testing of the imaging system.

Initially, a camera 16a captures an image of the vehicle 12 as shown in FIGS. 3A and 3B. A plurality of keypoints 31a, 31b, 31c, 31d are marked on the vehicle 12. In an example, four keypoints 31a through 31d are selected in order. A keypoint is a location on a vehicle that can be repeatably located images of a vehicle by machine vision software. Repeatably located means that machine vision software can determine the same point with respect to a vehicle in a plurality of images which can view the vehicle from different points of view. For example, keypoints of a vehicle can be the four corners of a vehicle's rectangular roof. An exemplary machine vision software technique for determining keypoints is SIFT, described in "Object recognition from local scale-invariant features" David G. Lowe, Proceedings of the International Conference on Computer Vision, 1999, pp. 1150-1157. A virtual vehicle is then instantiated within a coordinate frame of the camera 16a by the computer 20. A virtual vehicle is a computer model of a vehicle that includes mathematical data regarding shapes and textures corresponding to the exterior surfaces of a vehicle 12. For example, a virtual vehicle can be based on a computer aided design (CAD) file that includes geometric mesh data that describes the vehicle 12 in three dimensions at resolution and detail sufficient to be used to manufacture the parts that comprise the vehicle 12. The mathematical data included in the virtual vehicle can be used to generate a two-dimensional image of the vehicle from a selected point of view. The virtual vehicle can comprise the same real world dimensions as the vehicle 12. In an implementation, the deep neural network 58 classifies a make and a model of the vehicle 12 using conventional classification techniques.

Techniques described herein can use the vehicle's make and mode to access a library of virtual vehicles to select a virtual vehicle that matches the vehicle's make and model. The library of virtual vehicles can be generated from CAD files corresponding to each make and model of vehicle, for example. Because the virtual vehicle includes a 3D description of the vehicle's exterior surfaces, software executing on computer 20 can select a camera intrinsic matrix and instantiate a virtual vehicle by rendering an image of the virtual vehicle that appears as if a real world camera had acquired an image of a real-world vehicle. A camera intrinsic matrix includes camera parameters that determine the size, shape and locations of objects in an image and can include sensor size, focal distance, lens magnification and camera six-axis location and orientation with respect to the virtual vehicle. The virtual vehicle can include keypoints that match the keypoints that a machine vision software program like SIFT would locate on an image of a real world vehicle.

The computer 20 determines a set of rotation and translation parameters for the virtual vehicle that corresponds to the rotation and translation of the vehicle 12 relative to the camera 16a. The set of rotation and translation parameters can be indicated by a rotation matrix R and a translation matrix t. For example, the rotation matrix and the translation matrix may comprise a geometric center of vehicle 12, an x-component (x), a y-component (y), a z-component (z), a pitch component ($\theta$), a roll component ($\phi$), and a yaw component ($\psi$), wherein the x-, y-, and z-components are translations according to a Cartesian coordinate system (comprising an X-axis, a Y-axis, and Z-axis (Za)) and the roll, pitch, and yaw components are rotations about X-, Y-, and Z-axes, respectively, wherein the X- and Y-axes represent orthogonal directions used to define the camera's horizontal and vertical fields of view, respectively.

Figure 4:
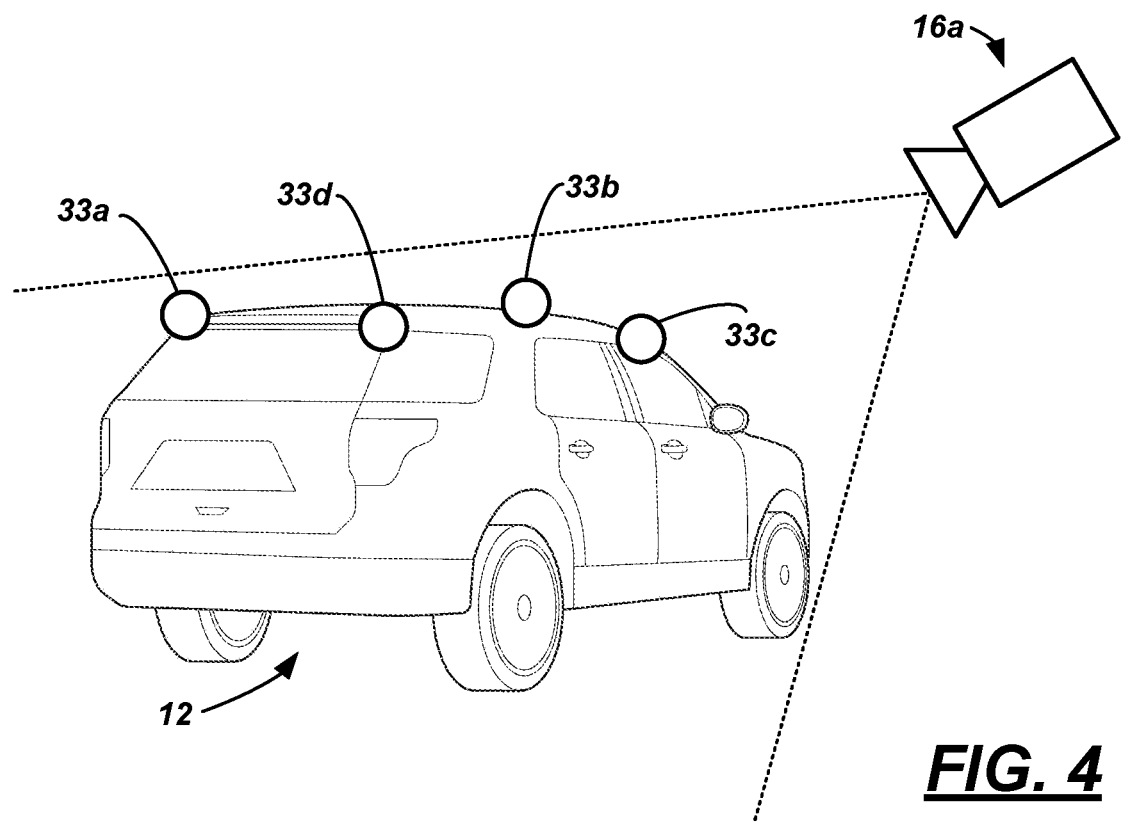
FIG. 4 is an isometric diagram of a vehicle having a plurality of keypoints.

As shown in FIG. 4, the computer 20 determines the set of rotation and translation parameters by matching a set of virtual keypoints 33a through 33d to the keypoints 31a through 31d of the vehicle 12. The set of virtual keypoints 33a through 33d are determined based on a conventional camera projection equation and a camera intrinsic matrix of the camera 16a. The computer 20 can use a non-linear optimization technique such, as Levenberg-Marquardt, is then used to optimize for the rotation matrix R and the translation matrix t to reduce the errors between the image projections of the virtual keypoints 33a through 33d and the keypoints 31a through 31d in the image frame.

By matching the virtual keypoints 33a through 33d to the keypoints 31a through 31d, the computer 20 determines the rotation matrix R and the translation matrix t for the virtual vehicle. The computer 20 determines the MDF of the vehicle 12 using the rotation matrix R and the translation matrix t for the virtual vehicle.

As the vehicle 12 traverses through the structure 14, the cameras 16a through 16c capture image frames including the vehicle 12. The computer 20 tracks the keypoints 31a through 31d as the vehicle progresses through the structure 14. The computer 20 can track the keypoints 31a through 31d via conventional computer vision based image point tracking techniques, such as Fast Library for Approximate Nearest Neighbors (FLANN). For the subsequent image frames, the MDF pose of the vehicle 12 is initialized with the previously known pose and then the non-linear optimization process is repeated to obtain the new MDF pose of the vehicle 12.

The computer 20 determines the MDF pose for the vehicle 12 by comparing a projected silhouette of the vehicle 12 to an actual silhouette of the vehicle 12 imaged by the camera and determines a silhouette error energy function $E_{silh}$ for each camera 16a through 16c. The silhouette of the vehicle 12 can be generated via conventional object detection and/or object classification techniques. The computer 20 then constrains the pose of the vehicle 12 to be on the ground 26 via a ground plane error energy function $E_{gnd}$. The computer 20 then calculates a cumulative energy function, E, for each frame, and the computer 20 uses the cumulative energy function to optimize for a MDF pose of the vehicle 12 relative to the camera 16a through 16c for each frame. A projection of Φ into a 2D image plane, Π(Φ$_{p,u}$), for a particular pixel u and pose p of the vehicle 12 in the camera coordinate frame can be defined as follows:

$$\Pi(\Phi_{p,u}) = 1 - \exp\left[\sum_{\forall X_{O,p,u}} \log\left(1 - \frac{e^{\Phi(X_O)\zeta}}{1 + e^{\Phi(X_O)\zeta}}\right)\right] \quad \text{Equation 1}$$

where the summation is calculated for all 3D points $X_O$ on a ray extending from a camera center and the pixel that intersects with the volume boundary of the 3D vehicle SDF Φ. The variable ζ controls the smoothness of the projection and can be a set constant (e.g., ζ=0.75). The variable ζ can be determined experimentally and is based upon the amount of noise or error present in the 3D points $X_O$.

Once this projection is obtained, an intersection with the 2D image silhouette is a residual $r_{silh}(p,u)$ at the particular pixel location u, and the vehicle pose p is determined by the computer according to:

$$r_{silh}(p,u) = -\log[\Pi(\Phi_{p,u})p_{fg}(u) + (1-\Pi(\Phi_{p,u}))p_{bg}(u)] \quad \text{Equation 2}$$

where $p_{fg}(u)$ is a probability of foreground at that pixel u and $p_{bg}(u)$ is the probability of background at that pixel. The probability of foreground and the background pixels are set according to:

Within the mask, $p_{fg}(u)=1$ and $p_{bg}(u)=0$
Outside the mask, $p_{bg}(u)=1$ and $p_{fg}(u)=0$.
The computer 20 calculates the silhouette energy function $E_{silh}$ according to:

$$E_{silh} = \frac{1}{|\Omega|}\sum_{u \in \Omega}[r_{silh}(u))]^2 \quad \text{Equation 3}$$

Where Ω is a number of pixels in the 2D camera image. The silhouette energy function $E_{silh}$ is a measure of alignment between the 2D image plane projection (silhouette) of the instantiated 3D model in the camera coordinate frame and the 2D mask (silhouette) of the vehicle 12 imaged by the camera 16a.

Given a MDF pose of the virtual vehicle, the computer 20 calculates a ground-plane energy function to ensure the virtual vehicle parallel to a ground plane at every point on its trajectory. The computer 20 can constrain a bottom portion of the virtual vehicle to be in contact with the ground plane by calculating a translational term, $E_{gnd}^{trans}$ according to:

$$E_{gnd}^{trans} = [t(y) - g(t(x,z))(y)))]^2 \quad \text{Equation 4}$$

Where t(y) is the height of the bottom of the car at position t(x,y,z), where t is the translational pose of the car and g(t(x,z))(y) is the height of the ground surface at pose t(x,z).

The computer 20 can then constrain the ground plane energy using a rotational term, $E_{gnd}^{rot}$, which constrains the rotation of the virtual vehicle so that it aligns with the ground plane by calculating a dot product between a vector centered at the car coordinate frame, pointing upwards (negative y direction in the vehicle coordinate frame), which is R[0,−1,0] and the normal vector for the ground plane, $n_g$. If the vehicle is parallel to the ground plane, the dot product (R[0,−1,0]·$n_g$) approaches 1.

The computer 20 subtracts the dot product from 1, and the difference is squared to get the quadratic error term for the rotational component of the ground energy according to:

$$E_{gnd}^{rot} = (1 - R[0,-1,0]^T \cdot n_g)^2 \quad \text{Equation 5}$$

The computer 20 then sums the translational and rotational energy terms for the ground plane constraint, weighted by scalars $\lambda_1$ and $\lambda_2$, to obtain a cumulative energy parameter responsible for constraining the pose of the virtual vehicle to the ground plane according to:

$$E_{gnd} = \lambda_1 E_{gnd}^{trans} + \lambda_2 E_{gnd}^{rot} \quad \text{Equation 6}$$

Where the scalars $\lambda_1$ and $\lambda_2$ are based on the point of view of the virtual camera parameters used to render the virtual vehicle and can be selected experimentally to reflect the relative contribution that translations and rotations make with respect to the cumulative energy parameter for a particular virtual camera and point of view. The computer 20 then calculates a total energy function as a weighted sum of the silhouette and the ground energy terms ($E_{silh}$ and $E_{gnd}$) as shown in Equation 7:

$$E = \lambda_3 E_{silh} + \lambda_4 E_{gnd} \quad \text{Equation 7.}$$

Where the scalars $\lambda_3$ and $\lambda_4$ are selected experimentally to reflect the relative contributions that the silhouette and ground energy terms ($E_{silh}$ and $E_{gnd}$) make to the total energy term. For example, if a silhouette is based on a top down view of the virtual vehicle, it likely does not contribute substantially to the ground plane constraint.

The computer 20 repeats this process for multiple, typically all, frames in the image sequence to obtain a total energy term, which is used by the computer 20 maintain the virtual vehicle on the ground plane within the image frames. By constraining the virtual vehicle to the ground plane, the computer 20 can determine the MDF pose of the virtual vehicle, which corresponds to the MDF pose of the vehicle 12. The computer 20 can continually determine the MDF pose of the vehicle 12 using the techniques described above. The sequence of MDF vehicle poses can be optimized by the computer using a non-linear optimization technique, e.g., Levenberg-Marquardt, that uses a cumulative residual from all energy terms in each image frame captured by the camera 16a.

Thus, the outputs of the deep neural network 58 may comprise the MDF pose of vehicle 12; e.g., outputs may comprise, each relative a geometric center of vehicle 12, an x-component (x), a y-component (y), a z-component (z), a pitch component (θ), a roll component (ϕ), and a yaw component (ψ), wherein the x-, y-, and z-components are translations according to a Cartesian coordinate system (comprising an X-axis, a Y-axis, and Z-axis) and the roll, pitch, and yaw components are rotations about X-, Y-, and Z-axes, respectively, wherein the X- and Y-axes represent orthogonal directions used to define the camera's horizontal and vertical fields of view, respectively. Using these values, as will be described in greater detail below, computer 20 may determine a highly-precise position of the vehicle 12 (e.g., with an accuracy of less than +/−3 centimeters).

While not shown, imaging system 10 may comprise multiple computers 20. E.g., such computers 20 may be networked together so computational tasks can be balanced and allocated as required.

Returning to FIGS. 1 and 2, wireless transceiver 22 may comprise a wireless chipset and matched antenna that facilitates short-range wireless communication links using protocols such as Bluetooth, Bluetooth Low Energy (BLE), Wi-Fi, Wi-Fi Direct, etc. Further, wireless transceiver 22 may be fixed to structure 14 and communicatively coupled to computer 20. In this manner, wireless transceiver 22 may be able to receive requests from vehicle 12 and pass them to computer 20 and/or receive commands from computer 20 and communicate the commands to vehicle 12.

While not shown, imaging system 10 may comprise multiple wireless transceivers 22. E.g., one or more wireless transceivers 22 may be respectively, communicatively coupled to a local computer 20. Spacing of the wireless transceivers 22 may be based upon signal strength within a predetermined region of the structure 14 and/or other factors.

In at least one example, imaging system 10 further may comprise a satellite-based positioning receiver 70 (FIG. 2) in communication with computer 20. In this manner, using the receiver 70, computer 20 may determine whether a satellite-based positioning signal is unsuitable (e.g., too attenuated) or is absent altogether. This aspect of system 10 is optional.

Figure 6:
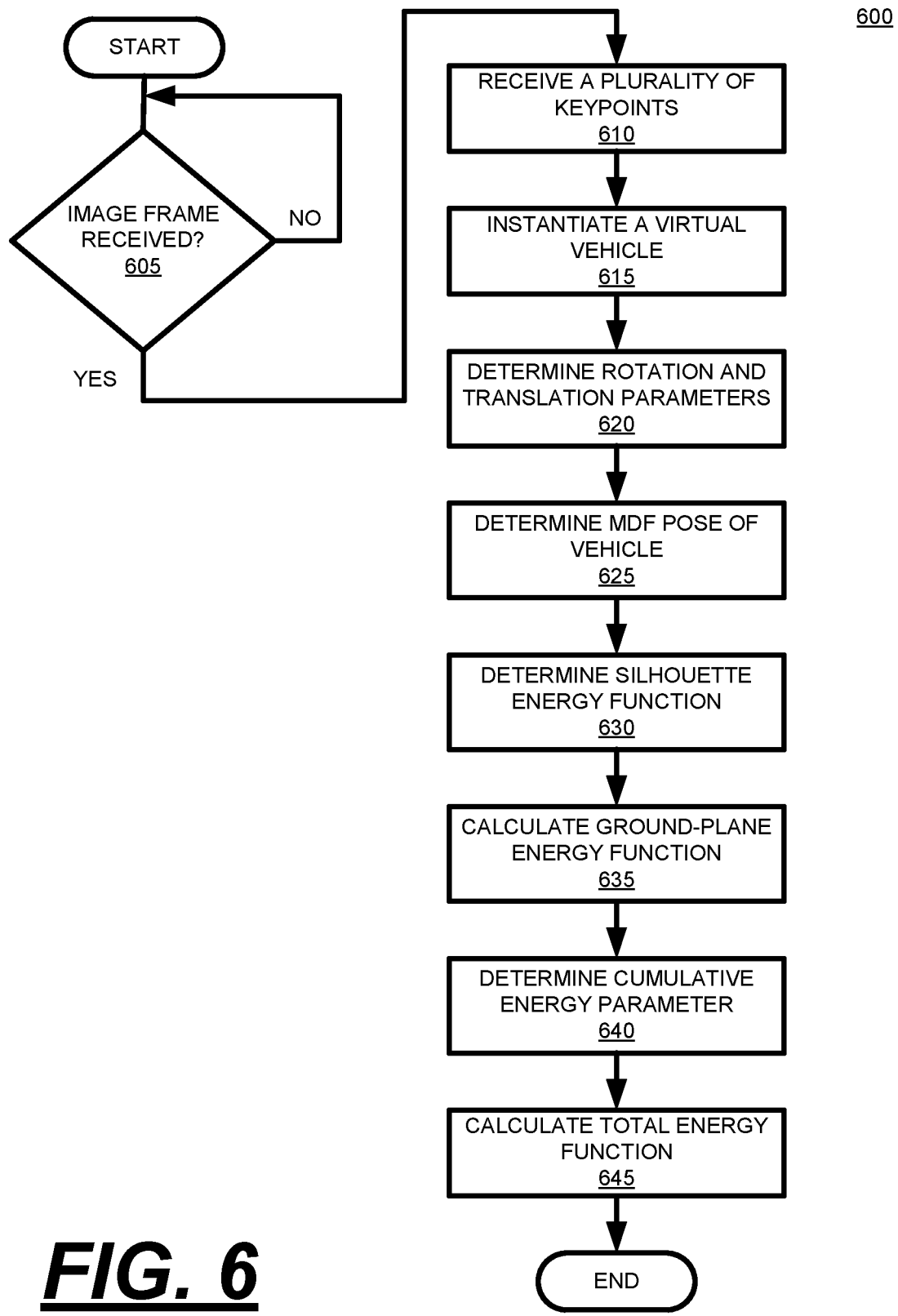
FIG. 6 is a flow diagram illustrating a process of determining an MDF pose of the vehicle.

Turning now to FIG. 6, a flow diagram is shown that illustrates an example process 600 of determining a MDF pose of a vehicle 12. The process 600 comprises software instructions executable by computer 20 (e.g., executable by the one or more processors 50 stored in memory 52). Non-limiting examples of software instructions are illustrated as instructional blocks in the diagram. It will be appreciated that while not necessarily explained explicitly in process 600, other software instructions may be carried out as well. In some instances, process 600 may comprise steps not executed by computer 20, but by other objects, devices, other computers, etc.

Process 600 may begin at block 605 in which a determination of whether an image frame has been received. If no image frame has been received from the camera 16a, the process 600 returns to block 605. Otherwise, a plurality of keypoints 31a through 31d are received indicating at least four markers to track a vehicle 12 depicted within the image frame at block 610. In an example implementation, the keypoints 31a through 31d may be manually entered via an input/output device. At block 615, a virtual vehicle is instantiated. At block 620, the computer 20 determines a set of rotation and translation parameters for the virtual vehicle that corresponds to the rotation and translation of the vehicle 12 relative to the camera 16a. At block 625, the computer 20 determines the MDF of the vehicle 12 using the rotation matrix R and the translation matrix t for the virtual vehicle.

At block 630, the computer 20 determines a silhouette error energy function $E_{silh}$ according to equation 3 described above. At block 635, the computer 20 calculates a ground-plane energy function to ensure the virtual vehicle parallel to a ground plane at every point on its trajectory according to Equation 4 described above. At block 640, the computer 20 determines the cumulative energy parameter responsible for constraining the pose of the virtual vehicle to the ground plane. At block 645, the computer 20 calculates a total energy function as a weighted sum of the silhouette and the ground energy terms ($E_{silh}$ and $E_{gnd}$) according to Equation 7 described above. The process 600 then ends.

Figure 7:
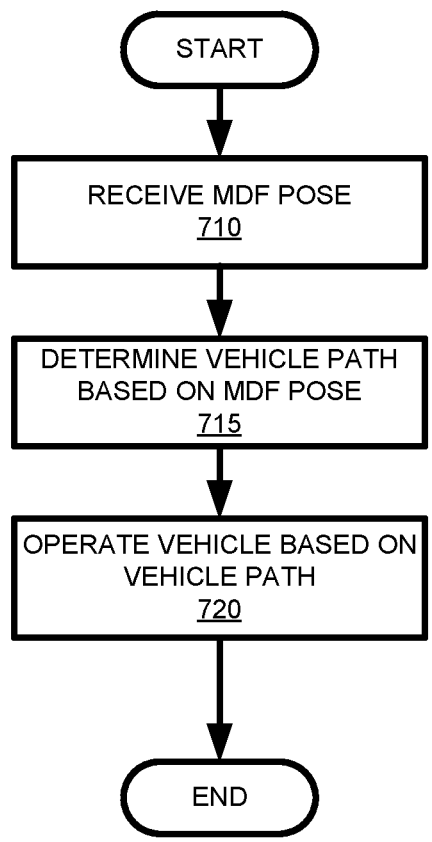
FIG. 7 is a flow diagram illustrating a process for operating a vehicle based on an MDF pose of the vehicle.

Turning now to FIG. 7, a flow diagram is shown that illustrates an example process 700 of operating a vehicle 12 based on a received MDF pose. The process 700 comprises software instructions executable by computer 36 in vehicle 12 (e.g., executable by the one or more processors included in computer 36 and stored in memory included in computer 36). Non-limiting examples of software instructions are illustrated as instructional blocks in the diagram. It will be appreciated that while not necessarily explained explicitly in process 700, other software instructions may be carried out as well. In some instances, process 700 may comprise steps not executed by computer 36, but by other objects, devices, other computers, etc.

Process 700 begins at block 710, where computer 36 receives an MDF pose. The MDF pose can be determined according to process 600 described in relation to FIG. 6. The MDF pose can include a description of route 32 and location data regarding portions of structure 14. Vehicle 12 can be operating in full or partial autonomous mode in a structure such as structure 14, for example, having an imaging system 10. The imaging system 10 can acquire data regarding vehicle 12 and determine an MDF pose for the vehicle 12 with respect to a route 32 and portions of structure 14 as discussed above in relation to FIGS. 1-6. Computer 36 in vehicle 12 can receive or download the MDF pose from computer 20 via wireless transceiver 22.

At block 715 computer 36 determines a vehicle path upon which to operate vehicle 12 based on the MDF pose, route 32 and portions of structure 14 received from computer 20. Computer 36 can determine, based on the MDF pose, route 32 and portions of structure 14 a vehicle route upon which vehicle 12 can operate that will cause the vehicle to travel along the route 32. In examples where the MDF pose indicates that the vehicle 12 is not located on the route 32, a vehicle path can be determined that will permit the vehicle 12 to travel to the route 32 while avoiding contact with portions of the structure 12. A vehicle path can be a polynomial function based on predicted motion of vehicle 12 in response to lateral and longitudinal accelerations applied to vehicle 12 by vehicle powertrain, vehicle brakes, and vehicle steering. The lateral and longitudinal accelerations can include both lower and upper limits.

At block 720, computer 36 can control vehicle powertrain, vehicle brakes and vehicle steering to cause vehicle 12 to travel along the determined vehicle path to travel to or along route 32 while avoiding contact with portions of structure 14. Computer 36 can control vehicle powertrain, vehicle brakes, and vehicle steering by sending commands via controllers corresponding to vehicle powertrain, vehicle brakes, and vehicle steering. The commands sent by computer 36 to vehicle powertrain, vehicle brakes, and vehicle steering can cause the vehicle 12 to travel along the vehicle path while maintaining lower and upper limits on lateral and longitudinal accelerations. Following block 720 process 700 ends.

In general, the computing systems and/or devices described may employ any of a number of computer operating systems, including, but by no means limited to, versions and/or varieties of the AppLink/Smart Device Link middleware, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, Python, etc. Some of these applications may be compiled and executed on a computing machine, such as the so-called Java Virtual Machine, the so-called Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Where databases, data repositories or other data stores are described herein, these may include various kinds of mechanisms for storing, accessing, and retrieving various kinds of data, including a hierarchical database, a set of files in a file system, an application database in a proprietary format, a database management system (DBMS), etc. Each such data store is generally included within a computing device employing a computer operating system such as one of those mentioned above and are accessed via a network in any one or more of a variety of manners. A file system may be accessible from a computer operating system and may include files stored in various formats. A DBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., wearable devices, servers, personal computers, etc.), stored on computer readable media associated therewith (e.g., disks, memories, etc.). A computer program product may comprise such instructions stored on computer readable media for carrying out the functions described herein.

The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. The processor may be programmed to process the sensor data.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A system comprising:
   a stationary computer comprising a first processor and a first memory, the first memory including first instructions executable by the first processor to:
      capture, from a camera, one or more images, wherein the one or more images include at least a portion of a vehicle;
      receive a plurality of keypoints corresponding to markers on the vehicle; instantiate a virtual vehicle corresponding to the vehicle;
      determine rotational and translation parameters of the vehicle by matching a plurality of virtual keypoints to the plurality of keypoints; and
      determine a multi-degree of freedom (MDF) pose of the vehicle based on the rotational and translation parameters based on tracking the vehicle through a plurality of images and determining the MDF pose of the vehicle in the plurality of images by comparing a projected silhouette of the vehicle to an actual silhouette of the vehicle for a plurality of cameras wherein the projected silhouette is generated by determining 3D points on a ray extending from a camera center that intersects with a volume boundary of the MDF pose; and
   a vehicle computer comprising a second processor and a second memory, the second memory including second instructions executable by the second processor to:
      receive the MDF pose in the vehicle computer;
      operate the vehicle by controlling vehicle powertrain, vehicle steering and vehicle brakes based on the MDF pose received in the vehicle.

2. The system of claim 1, wherein dimensions of the virtual vehicle correspond to dimensions of the vehicle.

3. The system of claim 1, wherein the first instructions include further instructions to determine a make and a model of the vehicle via a deep neural network.

4. The system of claim 3, wherein the deep neural network is a convolutional neural network (CNN).

5. The system of claim 1, wherein the camera is a red-green-blue-depth (RGBD) camera.

6. The system of claim 1, wherein the first instructions include further instructions to determine the MDF pose by constraining the MDF pose to be on a ground plane by determining a silhouette energy function which measures an alignment between the projected silhouette and the actual silhouette.

7. The system of claim 6, wherein the first instructions include further instructions to generate a projected silhouette by determining 3D points on a ray extending from a camera center that intersects with a volume boundary of the MDF pose.

8. The system of claim 1, wherein the first instructions include further instructions to determine the MDF pose by calculating a ground-plane energy function that ensures that the virtual vehicle is parallel to a ground plane at each point on its trajectory.

9. The system of claim 8, wherein the first instructions include further instructions to ensure that the virtual vehicle is parallel to the ground plane by constraining the rotation of the virtual vehicle by calculating a dot product between a vector centered at the virtual vehicle coordinate frame and a vector normal to the ground plane.

10. The system of claim 9, wherein the first instructions include further instructions to constrain the pose of the virtual vehicle to the ground plane by summing translational and rotational energy terms to obtain a cumulative energy parameter.

11. A method, comprising:
capturing, from a camera, one or more images, wherein the one or more images include at least a portion of a vehicle;
receiving a plurality of keypoints corresponding to markers on the vehicle;
instantiating a virtual vehicle corresponding to the vehicle;
determining rotational and translation parameters of the vehicle by matching a plurality of virtual keypoints to the plurality of keypoints; and
determining a multi-degree of freedom (MDF) pose of the vehicle based on the rotational and translation parameters based on tracking the vehicle through a plurality of images and determining the MDF pose of the vehicle in the plurality of images by comparing a projected silhouette of the vehicle to an actual silhouette of the vehicle for a plurality of cameras wherein the projected silhouette is generated by determining 3D points on a ray extending from a camera center that intersects with a volume boundary of the MDF pose; and
receiving the MDF pose in the vehicle;
operating the vehicle by controlling vehicle powertrain, vehicle steering and vehicle brakes based on the MDF pose received in the vehicle.

12. The method of claim 11, wherein dimensions of the virtual vehicle correspond to dimensions of the vehicle.

13. The method of claim 11, further comprising determining a make and a model of the vehicle via a deep neural network.

14. The method of claim 11, wherein the camera is a red-green-blue-depth (RGBD) camera.

15. The method of claim 11, further comprising determining the MDF pose by constraining the MDF pose to be on a ground plane by determining a silhouette energy function which measures an alignment between the projected silhouette and the actual silhouette.

16. The method of claim 15, further comprising generating a projected silhouette by determining 3D points on a ray extending from a camera center that intersects with a volume boundary of the MDF pose.

* * * * *